(12) United States Patent
Otsuka et al.

(10) Patent No.: US 8,650,912 B2
(45) Date of Patent: *Feb. 18, 2014

(54) BURNER AND METHOD FOR THE MANUFACTURE OF SYNTHETIC QUARTZ GLASS

(75) Inventors: Hisatoshi Otsuka, Niigata-ken (JP); Kazuo Shirota, Niigata-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/097,687

(22) Filed: Apr. 29, 2011

(65) Prior Publication Data

US 2011/0203318 A1    Aug. 25, 2011

Related U.S. Application Data

(62) Division of application No. 11/001,142, filed on Dec. 2, 2004, now abandoned.

(30) Foreign Application Priority Data

Dec. 5, 2003  (JP) ................................. 2003-406982

(51) Int. Cl.
*C03B 20/00*    (2006.01)

(52) U.S. Cl.
USPC .................................. 65/413; 65/414; 65/421

(58) Field of Classification Search
USPC ..................... 65/472, 413, 414, 421
See application file for complete search history.

(56) References Cited

U.S. PATENT DOCUMENTS

| 5,053,068 | A | * | 10/1991 | Kyoto et al. .................... 65/398 |
| 5,707,908 | A | | 1/1998 | Komine et al. |
| 6,087,283 | A | | 7/2000 | Jinbo et al. |
| 6,374,639 | B2 | | 4/2002 | Komine et al. |

(Continued)

FOREIGN PATENT DOCUMENTS

| EP | 0 525 984 A1 | 2/1993 |
| EP | 0 622 340 A1 | 11/1994 |

(Continued)

OTHER PUBLICATIONS

Machine translation of JP 2001-064023, Matsuo Koji et al., Production of Synthetic Quartz Glass Member, Mar. 2001.*

(Continued)

*Primary Examiner* — Queenie Dehghan
(74) *Attorney, Agent, or Firm* — Westerman, Hattori, Daniels & Adrian, LLP (57) ABSTRACT

A method for manufacturing quartz glass using a main burner having a multi-tube assembly having a center tube, a first enclosure tube surrounding the center tube, a second enclosure tube surrounding the first enclosure tube, a tubular shell surrounding the multi-tube assembly, and a plurality of nozzles disposed within the tubular shell, a double-tube assembly surrounding at least a forward opening of the main burner includes feeding silica-forming compound to the center tube, a combustion-supporting gas to the first enclosure tube and the nozzles, a combustible gas to the second enclosure tube and the tubular shell, and a combustion-supporting gas to the double-tube assembly, forming oxyhydrogen flame for hydrolyzing or decomposing the silica-forming compound to form silica, depositing the silica on the target, and melting and vitrifying the deposited silica into quartz glass.

7 Claims, 3 Drawing Sheets

(56) References Cited

U.S. PATENT DOCUMENTS

| | | | |
|---|---|---|---|
| 6,442,973 B1 | 9/2002 | Komine et al. | |
| 6,518,210 B1 | 2/2003 | Jinbo et al. | |
| 2001/0018834 A1* | 9/2001 | Matsuo et al. | 65/17.4 |
| 2003/0126889 A1 | 7/2003 | Otsuka et al. | |
| 2004/0112092 A1* | 6/2004 | Roba et al. | 65/414 |

FOREIGN PATENT DOCUMENTS

| | | |
|---|---|---|
| EP | 0 943 586 A2 | 9/1999 |
| EP | 1 278 009 A2 | 1/2003 |
| EP | 1 462 717 A2 | 9/2004 |
| JP | 56-054245 A | 5/1981 |
| JP | 62-162637 A | 7/1987 |
| JP | 01-142425 U | 9/1989 |
| JP | 04-193730 A | 7/1992 |
| JP | 06-199532 A | 7/1994 |
| JP | 06-305736 A | 11/1994 |
| JP | 08-104534 A | 4/1996 |
| JP | 08-259255 A | 10/1996 |
| JP | 09-100133 A | 4/1997 |
| JP | 11-079774 A | 3/1999 |
| JP | 2001-064023 A | 3/2001 |

OTHER PUBLICATIONS

Machine translation of JP 09-100133, Koaizawa Hisashi, Production of Porous Glass Preform for Optical Fiber, Apr. 1997.*

European Search Report dated Mar. 18, 2005, issued in corresponding European Patent Application No. 04257574.6.

Machine Translation of JP09100133, Koaizawa, Production of Porous Glass Preform for Optical Fiber, Apr. 15, 1997.

Japanese Office Action dated Jun. 10, 2009, issued in corresponding Japanese Patent Application No. 2004-345654.

* cited by examiner

BURNER AND METHOD FOR THE MANUFACTURE OF SYNTHETIC QUARTZ GLASS

CROSS-REFERENCE TO RELATED APPLICATION

This application is a Divisional of application Ser. No. 11/001,142, filed on Dec. 2, 2004 which claims priority from Japanese Patent Application No. 2003-406982 filed on Dec. 5, 2003, the entire contents of which being incorporated by reference.

BACKGROUND OF THE INVENTION

1. Technical Field

This invention relates to a burner for use in the manufacture of synthetic quartz glass ingots useful as the stock material for excimer laser synthetic quartz glass optical members and large-diameter synthetic quartz glass ingots useful as the stock material for liquid crystal-related large-size photomask substrates. More particularly, it relates to a burner for use in the manufacture of synthetic quartz glass ingots having optical-grade high homogeneity and a minimal change of light transmittance and useful as optical members such as lenses, prisms, mirrors, windows and photomask substrates in excimer laser systems, especially ArF excimer laser systems. The invention also relates to a method for the manufacture of synthetic quartz glass ingots.

2. Background Art

To meet the recent trend of LSI toward higher integration, the photolithography of defining an integrated circuit pattern on a wafer requires an image exposure technique on the order of submicron units. For finer line width patterning, efforts have been made to reduce the wavelength of a light source of the exposure system. In the lithography, a KrF excimer laser (wavelength 248 nm) took over the prior art i-line (wavelength 365 nm) as the mainstream light source in steppers; and the practical use of an ArF excimer laser (wavelength 193 nm) has recently started. Then, the lens for use in steppers is required to have homogeneity, improved UV transmission, and resistance to UV irradiation.

In order to avoid contamination with metal impurities which cause UV absorption, the synthesis of quartz glass is generally carried out by introducing the vapor of a high purity silicon compound such as silicon tetrachloride directly into an oxyhydrogen flame. Flame hydrolysis takes place to form silica fines, which are directly deposited on a rotating heat-resistant substrate such as quartz glass while being melted and vitrified thereon. In this way, transparent synthetic quartz glass is produced.

The transparent synthetic quartz glass thus produced exhibits satisfactory light transmittance in the short-wavelength range down to about 190 nm in the LSI field. It has been utilized as a material capable of transmitting UV laser light, specifically i-line and excimer laser light such as KrF (248 nm), XeCl (308 nm), XeBr (282 nm), XeF (351 and 353 nm) and ArF (193 nm), and the four-fold harmonic wave (250 nm) of YAG.

The absorption of light in the UV region that is newly created by irradiating synthetic quartz glass with UV light having great energy as emitted by an excimer laser is deemed to be due to the paramagnetic defects formed through photoreaction from intrinsic defects in synthetic quartz glass. Many light absorption bands due to such paramagnetic defects have been identified by ESR spectroscopy, for example, as E' center (Si.) and NBOHC (Si—O.).

The paramagnetic defects generally have an optical absorption band. When UV light is irradiated to quartz glass, the problematic absorption bands in the UV region due to paramagnetic defects in quartz glass are, for example, at 215 nm due to E' center (Si.) and 260 nm, which has not been accurately identified. These absorption bands are relatively broad and sometimes entail strong absorption. This is a serious problem when quartz glass is used as a transmissive material for ArF and KrF excimer lasers.

Intrinsic defects in synthetic quartz glass which cause paramagnetic defects arise from structures other than $SiO_2$ such as Si—OH and Si—Cl and oxygen-depleted or enriched structures such as Si—Si and Si—O—O—Si. As the approach for suppressing paramagnetic defects, it is proposed in JP-A 6-199532 to use a chlorine-free alkoxysilane such as tetramethoxysilane as the silane compound for preventing Si—Cl, one of paramagnetic defects, from being incorporated in glass.

It is also known that if hydrogen molecules are present in quartz glass in a concentration above a certain level, few defects of E' center (Si.) which are oxygen defects are formed, leading to improved durability to laser damage. Since ArF excimer laser light causes several times serious damages to quartz glass as compared with KrF excimer laser light, the quartz glass for ArF laser application must have several times higher a hydrogen molecule concentration than the quartz glass for KrF laser application.

It is proposed in JP-A 6-305736 to control the hydrogen molecule concentration in synthetic quartz glass. Depending on the energy using conditions of an ArF laser, the hydrogen molecular concentration in glass is adjusted.

Now that the efforts to reduce the wavelength of light source have reached excimer laser light having extremely greater energy than the traditional i-line light, active research works have been made on the laser durability of glass.

Exposure apparatus using such shorter wavelength light include many optical parts such as lenses, windows, prisms, and photomask-forming quartz glass substrates. With respect to projection lens materials among these optical parts used in exposure apparatus, the recent progress is toward a higher NA, the diameter of lens is annually increasing, and the optical homogeneity of lens material is required to be of higher precision. Especially for the ArF excimer laser, it is required that the initial transmittance of quartz glass, specifically the transmittance at wavelength 193.4 nm over the entire surface of an optical member be close to the theoretical value, the theoretical value at wavelength 193.4 nm being computed to be 99.85% by taking into account multiple reflection. Since the optical system in the exposure apparatus is composed of several to several tens of lenses, it is important that setting an initial transmittance of quartz glass even a little higher restrains the absorption of optical energy within the bulk of quartz glass, thereby minimizing a possibility that the light energy once absorbed is converted to thermal energy to incur a change of density and in some cases, a change of refractive index. In addition to the essential uniformity of refractive index, a reduction of birefringence becomes a crucial problem.

As stated above, in order to avoid contamination with metal impurities which cause UV absorption, the synthesis of quartz glass is generally carried out by introducing the vapor of a high purity organosilicon compound such as silicon tetrachloride directly into an oxyhydrogen flame. Flame hydrolysis takes place to form silica fines, which are directly deposited on a rotating heat-resistant substrate such as quartz glass and melted and vitrified thereon to form transparent synthetic quartz glass. The synthetic quartz glass ingot thus produced is sliced perpendicular to its growth direction whereupon a distribution of transmittance at wavelength 193.4 nm is determined in a plane of the growth direction. Then, the slice has an in-plane distribution, typically with the tendency that transmittance decreases from the center to the periphery. If the value required for the initial transmittance is at least 99.7% as an internal transmittance, for example, an effective portion of the synthetic quartz glass ingot that can be utilized, generally known as percent yield, is determined by this value.

Apart from the LSI application, large-size quartz glass substrates for photomasks are now used in the liquid crystal display (LCD) application. It is required to form synthetic quartz glass ingots for use as the stock material therefor to larger diameters, particularly when the percent yield of the manufacturing process of large-size glass substrates is considered. While the mainstream of conventional synthetic quartz glass substrates for IC use is of 6 inch square size, large-size glass substrates have already been required to have one side of 1 meter or longer. In fabricating large-size quartz glass substrates, as opposed to the synthetic quartz glass ingot for IC use which must have a diameter of about 100 to 140 mm, for example, an ingot which is of a conventional ingot diameter must be increased in length in order to insure a certain product weight. Shaping must be repeated many times until the size is tailored to a desired profile. The situation is detrimental in production yield and efficiency.

SUMMARY OF THE INVENTION

An object of the invention is to provide a burner for use in the manufacture of synthetic quartz glass ingots which serve as the stock material from which synthetic quartz glass members having high optical homogeneity useful as optical parts such as lenses, prisms, windows and photomask-forming quartz glass substrates in excimer laser systems can be readily obtained or synthetic quartz glass members for liquid crystal-related large size glass substrates can be efficiently obtained. Another object is to provide a method for the manufacture of synthetic quartz glass ingots using the burner.

In the manufacture of synthetic quartz glass ingots by vapor phase hydrolysis or oxidative decomposition of a silica-forming compound with the aid of an oxyhydrogen flame, the burner structure for forming a flame is important. The prior art burner is of the structure including a central triple-tube assembly, a tubular shell surrounding the triple-tube assembly, a plurality of nozzles disposed between the triple-tube assembly and the tubular shell, the foregoing components forming a main burner, and a tubular jacket disposed around the tubular shell and at the forward end of the main burner. Replacing the prior art burner by a burner for the manufacture of synthetic quartz glass comprising a main burner comprising at least a central triple-tube assembly, a tubular shell surrounding the triple-tube assembly, and a plurality of nozzles disposed between the triple-tube assembly and the tubular shell and within the confine of the tubular shell, and a double-tube assembly disposed around the main burner, the present invention has succeeded in manufacturing synthetic quartz glass ingots from which synthetic quartz glass having high optical homogeneity and synthetic quartz glass members for liquid crystal-related large size glass substrates are obtainable.

The inventors have intended to extend the effective portion over the entire region of the synthetic quartz glass ingot. Factors of the manufacturing process that substantially dictate the initial transmittance of a synthetic quartz glass ingot include a burner (structure and set conditions) which is an important constituent of the direct flame process, as well as a starting material or silane compound, a combustible gas (typically hydrogen) and a combustion-supporting gas (typically oxygen) fed thereto, and a balance of these gases. It has been found that the manufacturing process largely depends on the structure of burner among other factors.

In one aspect, the present invention provides a burner for use in the manufacture of synthetic quartz glass, comprising
a main burner comprising a multi-tube assembly of a three or more tube construction including a center tube for feeding a silica-forming compound, a first enclosure tube surrounding the center tube for feeding a combustion-supporting gas, and a second enclosure tube surrounding the first enclosure tube for feeding a combustible gas; a tubular shell surrounding the multi-tube assembly for feeding a combustible gas; and a plurality of nozzles disposed within the tubular shell for feeding a combustion-supporting gas, the main burner defining a forward opening, and
a double-tube assembly surrounding at least the forward opening of the main burner.

In a preferred embodiment, the double-tube assembly includes an outer tube and an inner tube disposed within the outer tube. The outer tube surrounds the forward opening of the main burner and projects further forward. The inner tube has a forward end which is disposed in register with or backward of the forward opening of the main burner.

In a preferred embodiment, the double-tube assembly defines therein a passage for a combustion-supporting gas. Typically, the combustion-supporting gas passage is defined between the outer and inner tubes.

In a preferred embodiment, the total cross-sectional area of gas discharge ports of the plurality of nozzles disposed in the tubular shell accounts for 5% to 20% of the cross-sectional area of a gas discharge region between the multi-tube assembly and the tubular shell.

Another aspect of the invention provides a method for the manufacture of a synthetic quartz glass ingot using the burner defined above, comprising the steps of placing the burner to face a quartz glass target mounted on a rotating support; feeding a silica-forming compound to the center tube, a combustion-supporting gas to the first enclosure tube and the nozzles, a combustible gas to the second enclosure tube and the tubular shell, and a combustion-supporting gas to the double-tube assembly; forming an oxyhydrogen flame from the combustion-supporting gas and the combustible gas for subjecting the silica-forming compound to vapor phase hydrolysis or oxidative decomposition to form silica fines; depositing the silica fines on the target; and melting and vitrifying the deposited silica into quartz glass.

In a preferred embodiment, the silica-forming compound is a silane or siloxane, the combustion-supporting gas is oxygen, and the combustible gas is hydrogen. The silica-forming compound and oxygen are fed to the burner such that the molar amount of the silica-forming compound is at least 1.3 times the stoichiometry of oxygen. The molar ratio of the amount of actually fed oxygen to the stoichiometry of oxygen necessary for the silica-forming compound and hydrogen fed to the burner is from 0.6 to 1.3. Typically, the combustion-supporting gas is fed through the double-tube assembly at a flow velocity of 0.5 to 1.3 m/sec.

Most often, the ingot has a diameter of at least 150 mm.

Using the burner of the invention, it becomes possible to manufacture synthetic quartz glass ingots which serve as the stock material from which are manufactured synthetic quartz glass members having high optical homogeneity for use in excimer laser systems, especially ArF excimer laser systems, optical members having high laser resistance, and optical members associated with light sources such as excimer lasers, and optical fibers for ultraviolet radiation.

DESCRIPTION OF THE PREFERRED EMBODIMENTS

The burner for use in the manufacture of synthetic quartz glass ingots according to the invention comprises a main burner which includes a multi-tube assembly of a three or more tube construction, a tubular shell surrounding the multi-tube assembly, and a plurality of nozzles disposed within the confine of the tubular shell. A double-tube assembly is disposed around the main burner.

Figure 1:
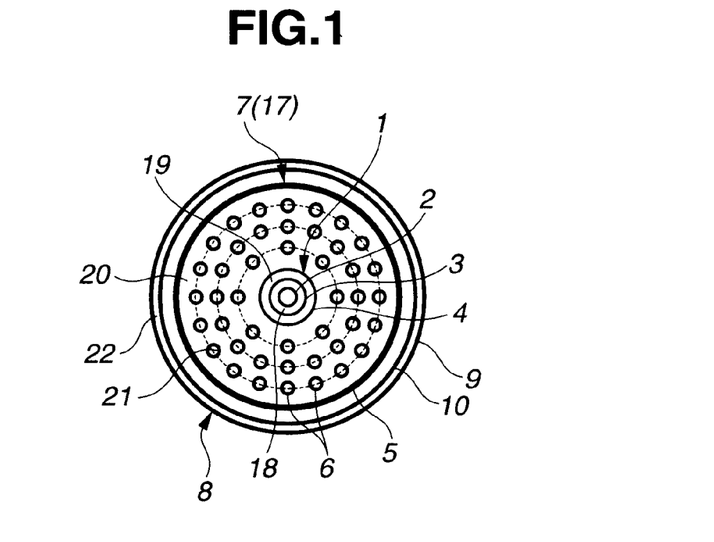
FIG. 1 is a transverse cross-sectional view of a burner for the manufacture of synthetic quartz glass in one embodiment of the invention, gas discharge ports of nozzles being depicted.
Figure 2:
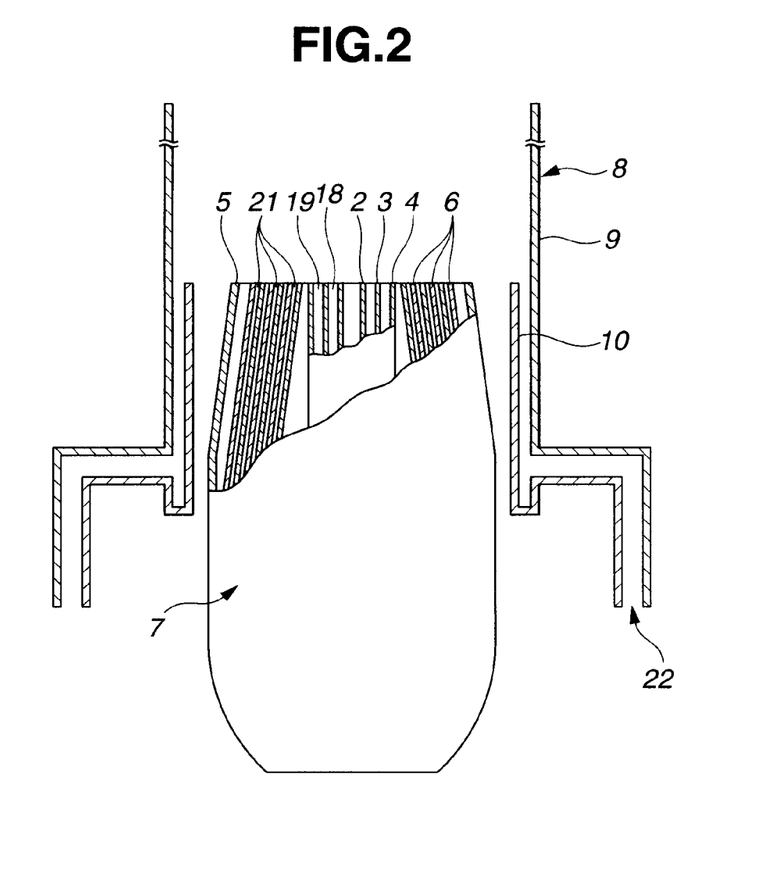
FIG. 2 is an elevational view, partially in axial cross section, of the burner of FIG. 1.

Referring to FIGS. 1 and 2, a burner according to one embodiment of the invention is illustrated. A multi-tube assembly 1 has a triple-tube construction including a center tube 2, a first enclosure tube 3 surrounding the center tube 2 to define a second passage, and a second enclosure tube 4 surrounding the first enclosure tube 3 to define a third passage. The multi-tube assembly (triple-tube assembly in the illustrated embodiment) 1 is surrounded by a tubular shell 5, and a plurality of nozzles 6 are disposed between the tubular shell 5 and the triple-tube assembly 1 and within the confine of the tubular shell 5. The multi-tube assembly 1, tubular shell 5 and nozzles 6 are so combined to constitute a main burner 7 which has a forward opening (depicted at the top in FIG. 2).

According to the invention, a double-tube assembly 8 is disposed so as to surround at least the forward opening of the main burner 7. The double-tube assembly 8 includes an outer tube 9 and an inner tube 10 disposed inside the outer tube 9 and outside the tubular shell 5 of the main burner 7. The forward end of the outer tube 9 of the double-tube assembly 8 surrounds the forward opening of the main burner 7 and projects forward of the forward opening. The outer tube 9 provides a guard so that the gas stream from the main burner 7 may not be spread outside the tubular shell 9. The forward end of the inner tube 10 is disposed in register with the forward opening of the main burner 7 although in another embodiment, the forward end of the inner tube 10 may be disposed backward of the forward opening of the main burner 7.

It is understood that the burner has an axis, to which tubes and shells extend generally parallel. As used herein, the terms "outside" or "outer" and "inside" or "inner" refer to radial positions with respect to the burner axis. Also, the terms "forward" and "backward" refer to relative positions along the burner axis. In the illustrated embodiment, all tubes and shells are shaped cylindrical and arranged in a concentric fashion to define annular spaces therebetween, though the shape is not critical.

Through the center tube 2, a silica-forming compound is fed and channeled, and generally oxygen gas or carrier gas is additionally fed and channeled. Through the second passage (within the confine of the first enclosure tube 3), a combustion-supporting gas such as oxygen is fed and channeled. Through the third passage (within the confine of the second enclosure tube 4), a combustible gas such as hydrogen is fed and channeled. Through the nozzles 6 and the double-tube assembly 8 (between the outer and inner tubes 9 and 10), a combustion-supporting gas such as oxygen is fed and channeled. Through the tubular shell 5, a combustible gas such as hydrogen is fed and channeled to flow about the nozzles 6.

In a preferred embodiment, the total cross-sectional area of gas discharge ports of the plurality of nozzles 6 disposed in the tubular shell 5, that is, the total cross-sectional area of lumens of nozzles 6, accounts for at least 5%, more preferably 5 to 20%, and most preferably 8 to 13% of the cross-sectional area of a gas discharge region between the triple-tube assembly 1 and the tubular shell 5, that is, the cross-sectional area of an annular space between the assembly 1 and the shell 5 (i.e., the cross-sectional area of an entire annular space between the assembly 1 and the shell 5 provided that the nozzles 6 are omitted).

The double-tube assembly 8 disposed outside the main burner 7 is typically made of quartz. It is also desirable that the combustion-supporting gas be channeled through the double-tube assembly 8 at a flow velocity of 0.5 to 1.3 m/sec. A flow velocity of less than 0.5 m/sec may allow for undesirable back fire whereas a flow velocity of more than 1.3 m/sec may disturb the flame of the main burner.

The number of nozzles 6 may be determined in accordance with the above conditions. The flow velocity of the combustion-supporting gas through the double-tube assembly 8 may be determined in accordance with the clearance between the outer and inner tubes 9 and 10 and the desired flow rate of combustion-supporting gas.

As compared with the prior art burner structure, the provision of the double-tube assembly around the tubular shell of the main burner ensures that when a synthetic quartz glass ingot is produced by the direct flame process, the temperature distribution in the melting face from the center to the periphery of the ingot growing face is uniform in that the high-temperature region at the center is expanded to the periphery. Thus the silica structure is formed under the same conditions between the center and the periphery during the deposition/fusion/vitrification process of silica fines on the ingot melting/growing face. This makes it possible to prevent the initial transmittance of the periphery of an ingot from lowering to below that of the center and to minimize the difference in initial transmittance between the periphery and the center. At the same time, the molten area is spread, making it possible to increase the diameter of a synthetic quartz glass ingot.

The provision of the double-tube assembly around the tubular shell of the prior art burner structure ensures that in a flame produced by the inventive burner, the high-temperature region is extended from inside flame to outside flame. This outside flame is applied to a peripheral portion of the ingot melting/growing face. The structure allowing the combustion-supporting gas to be channeled between the tubular shell of the main burner and the double-tube assembly ensures to increase the combustion efficiency of a combustible gas such as hydrogen gas fed around the nozzle group, making it possible to extend the high-temperature region throughout the flame. This is particularly true when the proportion of the cross-sectional area of nozzles disposed between the multi-tube assembly and the tubular shell is at least 5%. Further, the enclosure of the forward end of the main burner with the outer tube of the double-tube assembly prevents the flame from being disordered by gas streams within the furnace, concentrating the flame power.

Now it is described how to produce a synthetic quartz glass ingot using the inventive burner. The burner is placed to face a quartz glass target mounted on a rotating support. A silica-forming compound, a combustible gas such as hydrogen gas, and a combustion-supporting gas such as oxygen gas are separately fed to the tubes of the burner to form an oxyhydrogen flame with which the compound undergoes vapor phase hydrolysis or oxidative decomposition to form silica fines which deposit on the target. The silica fines are simultaneously melted and vitrified to form a synthetic quartz glass ingot.

The starting material, silica-forming compound used herein is typically an organosilicon compound which is preferably selected from silane compounds and siloxane compounds represented by the following general formulae (1), (2) and (3).

Herein each of $R^1$ and $R^2$, which may be the same or different, is a monovalent aliphatic hydrocarbon group, hydrogen or halogen atom and n is an integer of 0 to 4.

Herein $R^3$ is hydrogen or a monovalent aliphatic hydrocarbon group, m is an integer of at least 1, especially 1 or 2, and p is an integer of 3 to 5.

Examples of the monovalent aliphatic hydrocarbon groups represented by $R^1$, $R^2$ and $R^3$ include alkyl groups of 1 to 4 carbon atoms, such as methyl, ethyl, propyl, n-butyl and tert-butyl, cycloalkyl groups of 3 to 6 carbon atoms such as cyclohexyl, and alkenyl groups of 2 to 4 carbon atoms such as vinyl and allyl.

Examples of the silane compound represented by formula (1) include $SiCl_4$, $CH_3SiCl_3$, $Si(OCH_3)_4$, $Si(OCH_2CH_3)_4$, and $CH_3Si(OCH_3)_3$. Examples of the siloxane compounds represented by formulae (2) and (3) include hexamethyldisiloxane, hexamethylcyclotrisiloxane, octamethylcyclotetrasiloxane, and decamethylcyclopentasiloxane.

The silane or siloxane compound, a combustible gas (e.g., hydrogen, carbon monoxide, methane or propane) and a combustion-sustaining gas (e.g., oxygen) are fed to the burner for forming an oxyhydrogen flame.

An apparatus for producing a synthetic quartz glass ingot using the inventive burner may be of either vertical or lateral type.

The synthetic quartz glass ingot produced using the inventive burner preferably has an internal transmittance at wavelength 193.4 nm of at least 99.70%. The reason is that when the ingot is finally used as an optical member, it is sometimes required that the transmittance at the service wavelength which is 193.4 nm in the case of an ArF excimer laser, for example, be at least 99.70% in internal transmittance. If the internal transmittance is less than 99.70%, there is a possibility that when ArF excimer laser light is transmitted by a quartz glass member, light energy is absorbed and converted to thermal energy, which can cause changes in the density of the glass and also alter its refractive index. For instance, the use of a synthetic quartz glass ingot having an internal transmittance of less than 99.70% as a lens material for an exposure system which employs an ArF excimer laser as the light source may give rise to undesirable effects such as distortion of the image plane (or field curvature) due to changes in the refractive index of the lens material.

Thus, the burner must be configured and arranged as described above. For optimum operation of the burner, the silica-forming compound and oxygen are fed to the burner in such a mixing ratio that the molar amount of the silica-forming compound is at least 1.3 times, especially 2.0 to 3.0 times, the stoichiometry of oxygen.

Additionally, the molar ratio of the amount of actually fed oxygen to the stoichiometry of oxygen needed for the silica-forming compound (silane or siloxane compound) and hydrogen fed to the burner is preferably in a range of 0.6 to 1.3, more preferably 0.7 to 0.9.

Specifically, the silica-forming compound is fed to the center tube at a flow rate of preferably 0.3 to 0.7 $Nm^3$/hr, more preferably 0.4 to 0.5 $Nm^3$/hr. It is recommended that the combustion-supporting gas such as oxygen be fed to the center tube at a flow rate of 2.0 to 4.0 $Nm^3$/hr, more preferably 2.5 to 3.5 $Nm^3$/hr. Additionally, an inert gas such as argon may be fed.

Preferred settings for the remaining tubes are such that the flow rate of combustion-supporting gas through the first enclosure tube is 0.3 to 2.5 $Nm^3$/hr; the flow rate of combustible gas through the second enclosure tube is 12 to 15 $Nm^3$/hr; the flow rate of combustible gas through the shell is 20 to 25 $Nm^3$/hr; the total flow rate of combustion-supporting gas through the nozzles is 10 to 16 $Nm^3$/hr; and the flow rate of combustion-supporting gas through the double-tube assembly is 2 to 5 $Nm^3$/hr. The gas flow velocity through the double-tube assembly is preferably in the range of 0.5 to 1.3 m/sec.

Once the necessary gases are fed to the burner as specified above and burnt to form an oxyhydrogen flame, the silica-forming compound undergoes vapor phase hydrolysis or oxidative decomposition to form silica fines which deposit on the target. The silica fines are simultaneously melted and vitrified. The vitrifying temperature has a distribution on the growth face. By setting a minimum temperature at this time to at least 1800° C., preferably at least 2000° C. (with an upper limit of up to 2500° C., preferably up to 2400° C.), the region of synthetic quartz glass which has an internal transmittance at wavelength 193.4 nm of at least 99.70% can be enlarged. The use of the inventive burner and the setting of an optimum gas balance such as that between oxygen and hydrogen greatly contribute to the melting and vitrifying temperature at the growth face.

With respect to the transmittance versus the melting and vitrifying temperature at the growth face, the inventors have discovered that the melting face temperature exerts an influence on the transmittance at wavelengths shorter than 200 nm, especially at the wavelength of ArF excimer laser light (193.4 nm). Thus, a higher melting and vitrifying temperature makes it possible to maintain an internal transmittance of at least 99.70%. Moreover, within this range of conditions, it is possible to maintain the hydrogen molecule concentration in the synthetic quartz glass at a level of at least $3\ 10^{18}$ molecules/$cm^3$ and thus achieve a long-term stability (sufficient to restrain the transmittance from lowering) during excimer laser irradiation. It also becomes possible to produce a jumbo synthetic quartz glass ingot having a diameter of at least 150 mm, typically 150 to 500 mm, and especially 200 to 300 mm.

It is preferred for the synthetic quartz glass ingot produced using the inventive burner to have an internal transmittance at wavelength 193.4 nm of at least 99.70% over the entire surface of a slice when the ingot is sliced perpendicular to its axis. Also preferably the glass has an OH group content of 500 to 1,300 ppm, especially 800 to 900 ppm. Moreover, a hydrogen molecule concentration of at least $3 \cdot 10^{18}$ molecules/cm$^3$, preferably $3 \cdot 10^{18}$ to $6 \cdot 10^{18}$ molecules/cm$^3$, most preferably $3 \cdot 10^{18}$ to $5 \cdot 10^{18}$ molecules/cm$^3$ is desirable for good resistance to laser damage. Using the inventive burner, a synthetic quartz glass ingot having a large diameter can be produced, from which members for liquid crystal-related large-size glass substrates are effectively produced.

After a synthetic quartz glass ingot is produced, it is processed as by cylindrical grinding, thermoformed into a rectangular block as a mask substrate by heat melting at a temperature in the range of 1700 to 1800° C., annealed at a temperature in the range of 1000 to 1300° C. for strain relief, sliced and polished, completing a synthetic quartz glass substrate. When the synthetic quartz glass ingot is used as optical lens material, it is subjected to homogenizing treatment, obtaining synthetic quartz glass free of striae in three directions. Specifically, both ends of a synthetic quartz glass ingot are welded to synthetic quartz glass supporting rods held in a lathe and the ingot is drawn out to a diameter of 80 mm. One end of the ingot is then strongly heated with an oxyhydrogen burner to at least 1,700° C., and preferably at least 1,800° C., so as to form a molten zone. Then, the opposed chucks are rotated at different speeds to apply shear stress to the molten zone, thereby homogenizing the quartz glass ingot. At the same time, the burner is moved from one end of the ingot to the other end so as to homogenize the hydroxyl group concentration and hydrogen concentration within the ingot growth face (homogenization by the zone melting method). The resulting synthetic quartz glass is typically shaped to the desired dimensions, and then preferably annealed for the glass to take a uniform fictive temperature (FT). Annealing can be carried out by a conventional method.

Synthetic quartz glass members thus obtained are useful as optical quartz glass members including excimer laser lenses, synthetic quartz glass substrates for photomasks, stepper illumination system lenses, and projection optical system lenses, windows, mirrors, beam splitters and prisms in the LSI field; and members for large-size quartz glass substrates such as color filter substrates, dust-proof glass substrates and facing glass substrates in the liquid crystal field for LCD.

EXAMPLE

The following examples are provided to illustrate the invention, and are not intended to limit the scope thereof It is noted that in Examples, an internal transmittance was measured by ultraviolet spectrophotometry (Cary 400 by Varian Corp.).

Example and Comparative Example

A synthetic quartz glass ingot was produced by feeding methyltrimethoxysilane as the starting material to an inventive burner (FIG. 1) or a prior art burner (FIG. 3), effecting oxidative or combustion decomposition of the silane in an oxyhydrogen flame to form fine particles of silica, then depositing the silica particles on a rotating quartz target while melting and vitrifying them at the same time.

Figure 3:
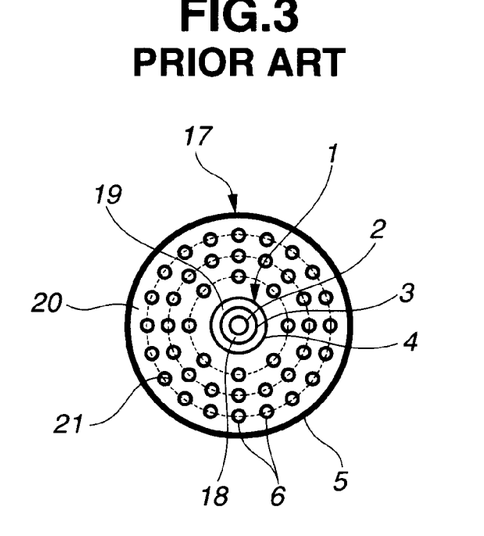
FIG. 3 schematically illustrates a prior art burner for the manufacture of synthetic quartz glass, gas discharge ports of nozzles being depicted in cross section.
Figure 4:
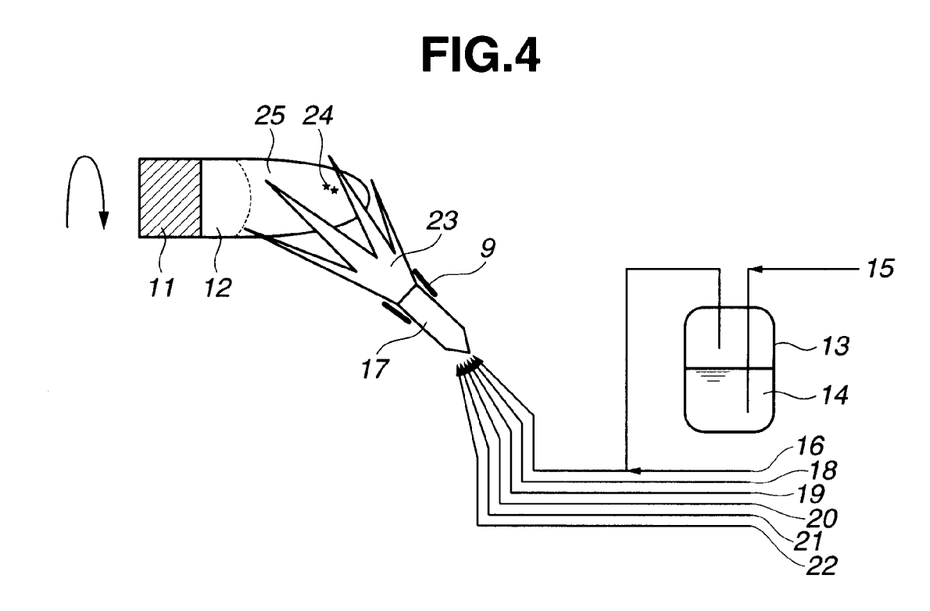
FIG. 4 schematically illustrates an exemplary synthetic quartz glass manufacturing system.

Specifically, as shown in FIG. 4, a quartz glass target 12 was mounted on a rotating heat-resistant support 11. Argon gas 15 was introduced into the methyltrimethoxysilane 14 held in a starting material vaporizer 13. Methyltrimethoxysilane 14 vapor was carried out of the vaporizer by the argon gas 15, and oxygen gas 16 was added to the silane-laden argon to form a gas mixture, which was then fed to the center tube of a main burner 17. As shown in FIGS. 1 and 3, the main burner 17 was also fed the following gases, in outward order from the foregoing gas mixture at the center: oxygen gas 18, hydrogen gas 19, hydrogen gas 20, oxygen gas 21, and oxygen gas 22. The starting material, methyltrimethoxysilane 14 and an oxyhydrogen flame 23 were discharged from the main burner 17 toward the target 12. Fine particles of silica 24 were deposited on the target 12 and simultaneously melted and vitrified as clear glass, forming a synthetic quartz glass ingot 25. The ingot thus obtained had a diameter of 150 mm and a length of 500 mm. The flow velocity of combustion-supporting gas through the double-tube assembly was 0.6 m/sec. The parameters of the burners of Example and Comparative Example including the cross-sectional areas of tubes or nozzles, their ratio and gas feed rates are shown in Table 1.

TABLE 1

|  |  | Example (FIG. 1) | | Comparative Example (FIG. 3) | |
| --- | --- | --- | --- | --- | --- |
|  | Gas | Cross-sectional area (mm$^2$) | Gas flow rate (Nm$^3$/hr) | Cross-sectional area (mm$^2$) | Gas flow rate (Nm$^3$/hr) |
| Center tube | Silane | 15 | 0.4 | 13 | 0.4 |
|  | O$_2$ |  | 3.0 |  | 2.0 |
|  | Ar |  | 0.1 |  | 0.1 |
| 1st enclosure tube | O$_2$ | 30 | 1.0 | 32 | 1.0 |
| 2nd enclosure tube | H$_2$ | 50 | 14.0 | 60 | 15.0 |
| Shell | H$_2$ | 1,700 | 24.0 | 1,800 | 25.0 |
| Nozzles | O$_2$ | 150 | 12.0 | 80 | 16.0 |
| Double-tube assembly | O$_2$ | 1,090 | 2.5 | — |  |
| Cross-sectional area ratio (%) | nozzles | 8.8 | | 4.4 | |

Note:
Cross-sectional area ratio is a percentage of the total cross-sectional area of lumens of nozzles divided by the cross-sectional area of an annular space (prior to nozzle arrangement) between the second enclosure tube and the tubular shell.

Figure 5:
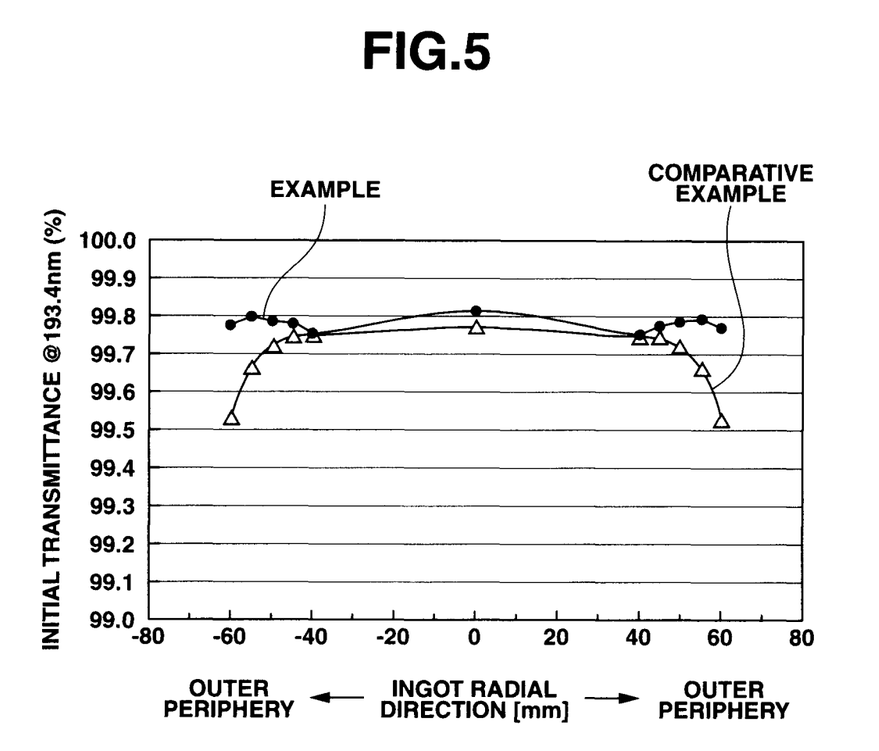
FIG. 5 is a graph showing the radial distribution of initial transmittance of synthetic quartz glass ingots of Example and Comparative Example.

Next, the synthetic quartz glass ingots produced in Example and Comparative Example were sliced. Each slice was mirror finished. The distribution of initial transmittance at 193.4 nm of the slice from the center to the periphery was measured by ultraviolet spectrophotometry (Cary 400 by Varian Corp.). The results are shown in FIG. 5.

Japanese Patent Application No. 2003-406982 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

We claim:

1. A method for the manufacture of a synthetic quartz glass ingot using a burner comprising a main burner comprising a multi-tube assembly of a three or more tube construction including a center tube, a first enclosure tube surrounding the center tube, and a second enclosure tube surrounding the first enclosure tube, a tubular shell surrounding the multi-tube assembly, and a plurality of nozzles disposed within the tubular shell, the main burner defining a forward opening, and a double-tube assembly surrounding at least the forward opening of the main burner; said method comprising the steps of:

placing the burner to face a quartz glass target mounted on a rotating support, feeding a silica-forming compound to the center tube, a combustion-supporting gas to the first enclosure tube and the nozzles, a combustible gas to the second enclosure tube and the tubular shell, and a combustion-supporting gas to the double-tube assembly, wherein the combustible gas fed through the tubular shell is channeled to flow about the nozzles, forming an oxyhydrogen flame from the combustion-supporting gas and the combustible gas for subjecting the silica-forming compound to vapor phase hydrolysis or oxidative decomposition to form silica fines, depositing the silica fines on the target, and simultaneously melting and vitrifying the deposited silica into quartz glass;

wherein the silica-forming compound is fed to the center tube at a flow rate of 0.3 to 0.7 $Nm^3/hr$, combustion-supporting gas is additionally fed to the center tube at a flow rate of 2.0 to 4.0 $Nm^3/hr$, the flow rate of combustion-supporting gas through the first enclosure tube is 0.3 to 2.5 $Nm^3/hr$ the flow rate of combustible gas through the second enclosure tube is 12 to 15 $Nm^3/hr$, the flow rate of combustible gas through the shell is 20 to 25 $Nm^3/hr$, the total flow rate of combustion-supporting gas through the nozzles is 10 to 16 $Nm^3/hr$, and the flow rate of combustion-supporting gas through the double-tube assembly is 2 to 5 $Nm^3/hr$.

2. The method of claim 1, wherein the silica-forming compound is a silane or siloxane, the combustion-supporting gas is oxygen, the combustible gas is hydrogen, the silica-forming compound and oxygen are fed to the burner such that the molar amount of the silica-forming compound is at least 1.3 times the stoichiometry of oxygen, and the molar ratio of the amount of actually fed oxygen to the stoichiometry of oxygen needed for the silica-forming compound and hydrogen fed to the burner is from 0.6 to 1.3.

3. The method of claim 1, wherein the combustion-supporting gas is fed through the double-tube assembly at a flow velocity of 0.5 to 1.3 m/sec.

4. The method of claim 1, wherein the ingot has a diameter of at least 150 mm.

5. The method of claim 1, wherein said double-tube assembly includes an outer tube and an inner tube disposed within the outer tube, said outer tube surrounds the forward opening of the main burner and projects further forward, said inner tube has a forward end which is disposed in register with or backward of the forward opening of the main burner.

6. The method of claim 1, wherein of gas discharge ports of the plurality of nozzles disposed in the tubular shell accounts for 5% to 20% of the cross-sectional area the total cross-sectional area of a gas discharge region between the multi-tube assembly and the tubular shell.

7. The method of claim 1, wherein a minimum temperature is at least 1800° C. when the silica fines are simultaneously melted and vitrified.

* * * * *